Figure 2:
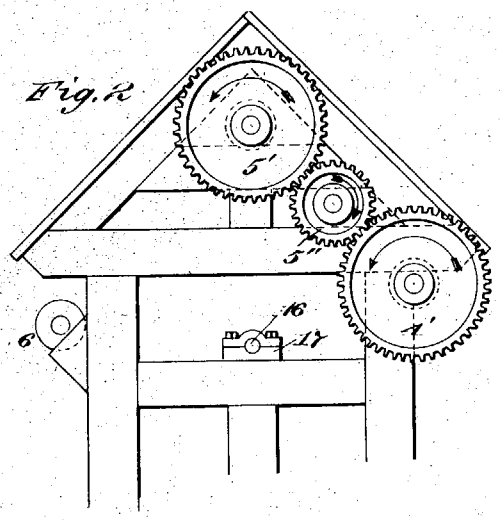

J. W. GRAVES.

BALING PRESS FOR COTTON.

No. 11,604. Reissued June 1, 1897.

Witnesses:
J. F. Coleman
Carl E. Pelz

Inventor
John W. Graves
by Francis L. Dyer
Att'y.

J. W. GRAVES.

BALING PRESS FOR COTTON.

No. 11,604. Reissued June 1, 1897.

Witnesses;

J. F. Oleman

Carl E. Pelz

Inventor

John W. Graves by Frank L. Ayer

Att'y.

3 Sheets—Sheet 3.

J. W. GRAVES.

BALING PRESS FOR COTTON.

No. 11,604. Reissued June 1, 1897.

Witnesses:

J. F. Coleman

Carl E. Pilz

Inventor

John W. Graves by Frank L. Iper

Atty.

UNITED STATES PATENT OFFICE.

JOHN W. GRAVES, OF LITTLE ROCK, ARKANSAS, ASSIGNOR, BY MESNE ASSIGNMENTS, TO THE STANDARD CIRCULAR COTTON COMPANY, LIMITED, OF LIVERPOOL, ENGLAND.

BALING-PRESS FOR COTTON.

SPECIFICATION forming part of Reissued Letters Patent No. 11,604, dated June 1, 1897.

Original No. 510,388, dated December 5, 1893. Application for reissue filed January 24, 1895. Serial No. 536,289.

*To all whom it may concern:*

Be it known that I, JOHN W. GRAVES, a citizen of the United States, residing at Little Rock, in the county of Pulaski and State of Arkansas, have invented certain new and useful Improvements in Baling-Presses for Cotton, &c.; and I do hereby declare the following to be a full, clear, and exact description of the invention, such as will enable others skilled in the art to which it appertains to make and use the same.

My invention relates generally to baling-presses for cotton and other fibrous materials, and particularly to certain improvements in that class thereof in which the fibers are pressed into cylindrical bales.

In using the presses hitherto usually employed for baling cotton it has been customary to feed the same into the presses in large quantities or bulk, the result being that the fibers, as they are only subjected to superficial compression, constantly exert their resiliency or elasticity in opposition thereto and expand to a considerable extent; hence the necessity for using a number of strong iron bands for securing such bales in their even loosely-pressed condition. Bales, whether made by plantation-presses or the many times more powerful compresses, mainly expand in one direction—viz., that in which the pressure is applied and compression effected. In other words, such bales only expand in slight degree in length or breadth, but greatly in depth or thickness. Modern compresses apply enormous pressures to bales previously prepared by ordinary presses, but no way has yet been discovered for saving or retaining the density thus imparted thereto. Instead of using these presses and compresses for baling cotton, as above described, my invention accomplishes the results desired by feeding the fiber in the form of a bat or thin sheet into the press, winding it around and around upon itself or layer upon layer, and simultaneously subjecting the same to friction and pressure as it is formed into a bale. The fibers will be thus closely pressed together both from the under and upper side of said bat or sheet, and thus will acquire strength or coherence exactly in proportion to the pressure applied thereto.

My invention consists, first, in improved mechanism for baling cotton and other fibrous materials which consists in feeding and simultaneously subjecting the same in the form of a bat or sheet to friction and pressure during the baling operation, preferably by means of a belt, within the loop or bight of which the bale is formed by continuous accretion and rotation of the fiber and by effecting its compression in detail or layer upon layer as it is fed to the bale, which is preferably effected, when baling cotton, by delivering the sheet or bat into the press from the condenser of a gin in an unbroken condition; second, in mechanism for causing the bat or sheet of fiber as it is fed into the press to be subjected to constant friction and pressure, which pressure, never being released until the bale is finished, results in the greatest attainable density of the material and in the layers throughout the bale, constituting retaining-bands for those wound interiorly thereof; third, in mechanism which is adapted for applying the covering or bands, when such are used, to the completed bale without permitting the same to expand; fourth, in devices for permitting the loop or bight of the belt to automatically accommodate itself to the increasing size of the bale; fifth, in automatic tensioning devices whereby the pull or pressure upon the belt is increased approximately in the ratio of increase of the diameter of the bale; sixth, in automatic devices for sustaining the increasing size and weight of the bale in the same plane while permitting it to move laterally away from the rollers between which the bight of the belt is formed, and, seventh, in the special mechanisms employed for carrying out the objects or purposes of this invention, as hereinafter fully disclosed in the description, drawings, and claims.

The objects of my invention are, first, to so press the bat as it is delivered from the cotton-gin condenser or elsewhere that its fibers will not be broken or subjected to any deteriorating influence, and also to avoid the danger that is inseparable from the use of a lint-room; second, to effect such condensation of the fiber in the first instance as will place it in proper condition for ocean and other shipment and thus obviate the present enormous expense of hauling it to storage-warehouses and compresses, and also of recompressing plantation-bales; third, to effect the compression or baling of the fiber by winding the bat smoothly or without tangling or twisting its fiber around a small, removable spindle, so that the tensile strength of the bat will constitute the main retaining element or holding means for the completed bale, and so that any light wrapping or covering which will arrest the expansion of the outer layer of the bat will also prevent all expansion of the rest of said bale, and also the fiber will be left in such condition that when said covering has been removed the rotation of said bale can be reversed and the bat unwound in a continuous or unbroken sheet, but in a more compressed condition than when it was originally delivered from the condenser; fourth, to so press and wind the bat that its edges at the ends of the bale will be open to inspection and sampling throughout its diameter without mutilating the bale or disturbing its covering or binding, and, fifth, to provide a machine or press at a moderate cost which will be simple in construction and certain and reliable in operation. These objects are accomplished by the mechanism illustrated in the accompanying drawings, forming part of this specification, in which the same reference-numerals indicate the same or equivalent parts, and in which—

Figure 3:
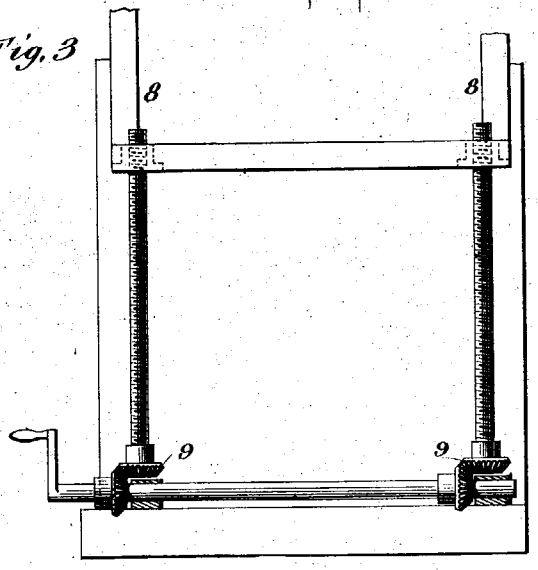
Figure 1:
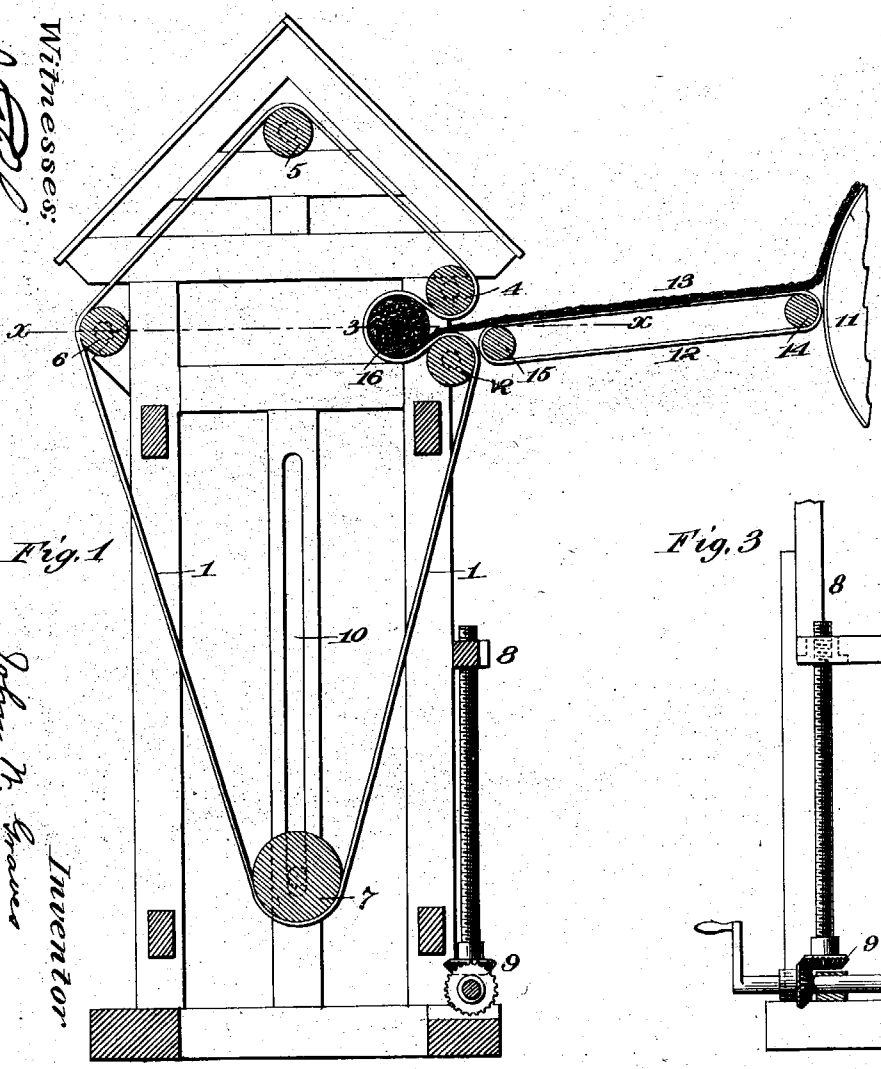
Figure 4:
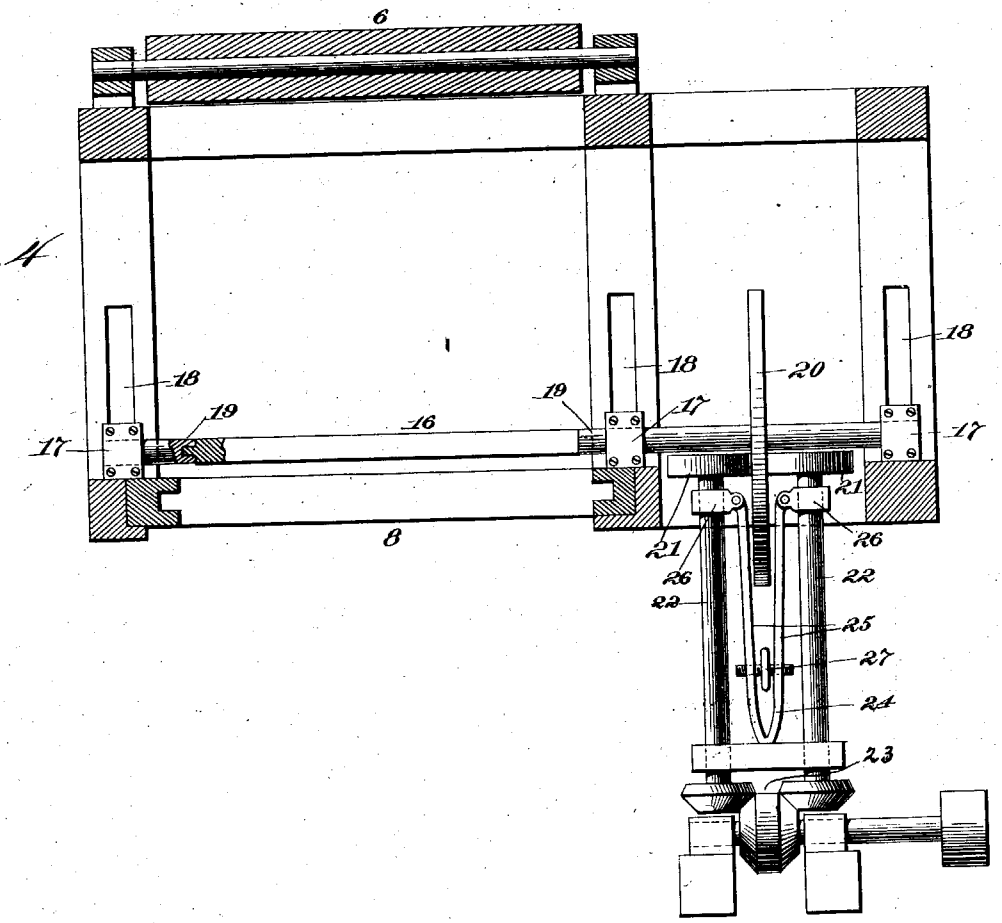
Figure 5:
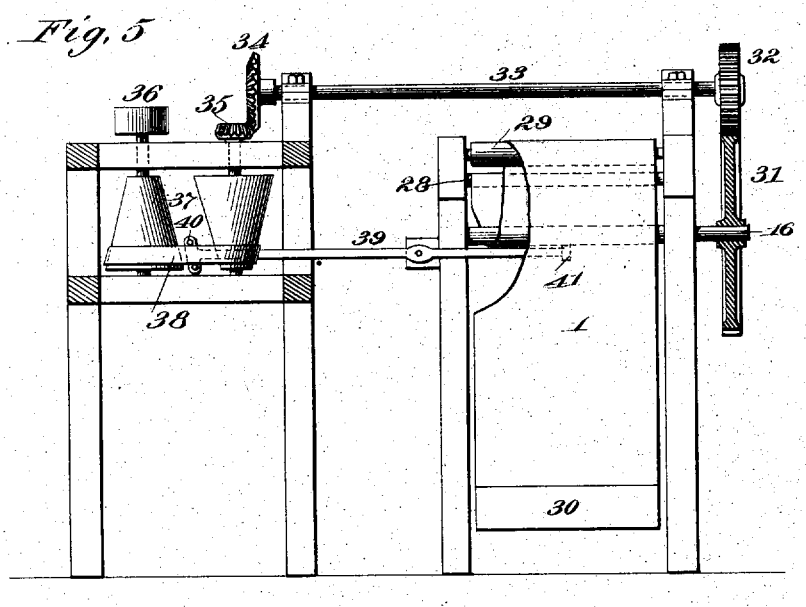

Figure 1 represents a vertical transverse section of the preferred construction of my baling-press, showing also an endless conveying or feeding apron and a portion of a condenser in connection with said press; Fig. 2, a broken end or side elevation of the press, showing one way of driving the compression-belt; Fig. 3, a broken front elevation of the lower part of the press-frame, showing the sliding or adjustable devices for lowering or raising the lower roller; Fig. 4, a horizontal section on the line $x\,x$ of Fig. 1, showing gearing for imparting differential speed to the spindle upon which the bale is formed when it is desired to apply power to said spindle instead of to the belt; Fig. 5, a front elevation of a modified construction of my baling-press, and Fig. 6 an end view of the same.

In Fig. 1 of the drawings the numeral 1 indicates the endless compressing and retaining belt, which passes over the roller 2, around the bale 3, around the roller 4, over the suspension-roller 5 and the guide-roller 6, around or under the heavy tension-roller 7, and thence upward to the starting-point. This arrangement of the endless belt forms a loop or bight, which receives the fibrous material as it passes between the rollers 2 and 4 and is undergoing the process of baling. The rollers 4, 5, and 6 rotate in ordinary fixed journal-boxes, (not shown,) while the roller 2 is journaled at the upper end of the sliding frame 8, which is raised and lowered by the screw-and-bevel-wheel gearing 9, as shown in Figs. 1 and 3. The heavy tension-roller 7 is supported by the belt 1 except when at its extreme lower position, when its journals rest in the bottoms of the guide-grooves 10; also, this tension-roller is raised and lowered by the belt 1, being guided by its journal in said grooves. If desired, however, sliding journal-boxes may be employed for the journals of this roller.

The endless belt 1 is driven by frictional contact with the rollers 4 and 5, on the ends of which, as shown in Fig. 2, are secured the gear-wheels 4′ and 5′, which mesh with the smaller gear-wheel 5″, so that they may be revolved in the same direction. Power for driving these gear-wheels and rollers may be transmitted from the condenser or other suitable source.

In Fig. 1 of the drawings only so much of the condenser 11 is represented as is necessary to show its connection with the baling-press by the conveying-apron 12, which receives the bat 13 from said condenser and conveys it to said press. This apron passes over and is rotated by the rollers 14 and 15, which are to be driven at the same speed. Assuming the parts in this figure to be in the position shown, except the bale 3, that the gin and condenser are in operation, that the belt is driven as stated, and that the rollers 14 and 15 are driven by belts from said condenser and at the same peripheral speed, the operation will be as follows: The bat 13 is first started through the opening between the rollers 2 and 4 by the movement of the belt, and is then turned or wound over and over upon itself in layers around a small spindle 16, the central part whereof is removable, as will be explained, and against which the bat is pressed by the belt, and assumes the form of a small roll, which gradually distends the loop or bight of the belt 1 and gradually lifts the heavy tension-roller 7, which being continued results in the formation of the desired size of bale within said loop or bight of the belt, such bale at all stages of its formation being caused to revolve by the friction of the belt 1. The loop or bight of the belt, however, is very little distended or expanded until the size and density of the bale therein become sufficient to overcome the resistance or weight of the roller 7, but under the continuous accretion of fiber constituting the bat the bale first increases in density with only little increase in volume, and then it slowly begins to farther distend said loop or bight, which will result in raising said roller and increasing the friction and pressure upon said bale. The density of the bale will at this stage of the baling operation be proportional to the weight of said roller and to the extent of the frictional surface of the belt against the bale. Hence to continue to uniformly compress the cotton the tension or frictional contact of said belt with the bale should be increased exactly in proportion to the increase in circumference of said bale, which may be accomplished, for instance, by applying additional weight at intervals to the journals of the tension-roller. In other words, the pressure first imposed upon the bale is that produced by the weight of the belt and by the power required to drive the same, which, owing to the small size of the bale, is sufficient to effect the required density, and then as the bale increases in size additional pressure is imposed thereon, as stated, by the weight of the tension-roller and by the application of additional weight thereto at intervals. After the bale has reached the desired size the bat or sheet of fiber is cut off and a wrap or cover of any desired character is placed upon the belt immediately over the roller 2 and is carried one or more times, preferably twice, around the bale and secured, thus holding the same against unwinding and expansion. By discontinuing the rotation of belt 1, by sufficiently lowering said roller 2 by means of the frame 8 and gearing 9, and by detaching the removable part of the spindle 16, the removal of the bale 3 from the bight of said belt is permitted, and when said roller 2 is again elevated and the removable part of the spindle 16 or a corresponding part is replaced in the machine the press will be in proper condition for repeating this method of baling.

In order to support the bale in a horizontal position while it is being formed, to sustain the weight thereof, and at the same time to provide for its gradual increase in diameter within the loop or bight of the belt 1, I employ the shaft or spindle 16, the central part of which is removable from the ends thereof, as stated, and mount the same in journal-boxes 17, which slide upon and in the guides or ways 18, as shown in end and plan views, respectively, in Figs. 1, 2, and 4. The removable part of this spindle is formed with angular ends 19, which fit into correspondingly-shaped recesses in its adjacent parts, which, on being disconnected, permit of the removal of said removable part of the spindle and the bale wound thereon; also, for the same purpose said spindle may be continuous and rest at its ends in journal-boxes having removable tops, or it may consist of one or two short angular removable journals projecting into and carrying an angularly-hollowed spindle or shaft within the bale, it being only necessary to provide some suitable means for the ready removal of said spindle from the machine after the completion of the bale.

As the rollers 14 and 15 operate the conveying or feeding apron at a uniform rate of speed, and consequently deliver the sheet or bat 13 in uniform quantity into the loop or bight of the belt 1, it follows, as the diameter of the bale 3 gradually increases from the start or as each layer of fiber is added thereto, that provision must be made for gradually lessening the rate of rotation of said bale as it increases in diameter, so as to prevent the rupture of said bat and consequent discontinuation of its delivery to the press. When the belt 1 is driven and the bale is revolved by the friction thereof, as above described, this result is necessarily accomplished; but if instead it is desired to apply power to the spindle the same result may be accomplished by the differential or variable-speed gear, (illustrated in Fig. 4 of the drawings,) in which the angular spindle 16 is provided with a large metallic disk 20, which is gripped between the two smaller friction-wheels 21, which are secured to the inner ends of the horizontally-arranged shafts 22 and driven in reverse or opposite directions over the faces of said disk by suitable gearing 23, connected with the outer ends of said shafts. Intermediate of these shafts is arranged a bifurcated spring 24, which is suitably supported at its outer end and projects inwardly to a point near said friction-wheels 21, where its arms or branches 25 are pivoted to collars 26, surrounding said shafts. Near the outer end of this spring, between its arms or branches, is arranged a hand-wheel 27, which is provided with laterally-projecting right and left hand screws passing through screw-threaded holes formed in said branches for the purpose of regulating the friction or gripping contact between said friction-wheels 21 and the large disk 20. As the bale increases in diameter its center moves inward or away from the feed-opening leading into the bight of the belt and carries with it the movable spindle 16, its journal-boxes 17, and said bight of the belt, and also causes the large disk 20 to move inward and present gradually-increasing contact-surfaces to the friction-wheels 21, the result being that a uniform peripheral speed is imparted to said bale, an uninterrupted feed of the bat secured, and a bale produced in which the driving force applied to the spindle increases with the diameter of the bale, thus causing each layer to be tightened upon those nearer the center. This latter action, which occurs only when power is applied to the spindle, can be clearly demonstrated by comparison with a map or sheet of paper first loosely rolled into a hollow cylinder and then rolled from its center into smaller and smaller compass until it becomes perfectly solid.

Figure 6:
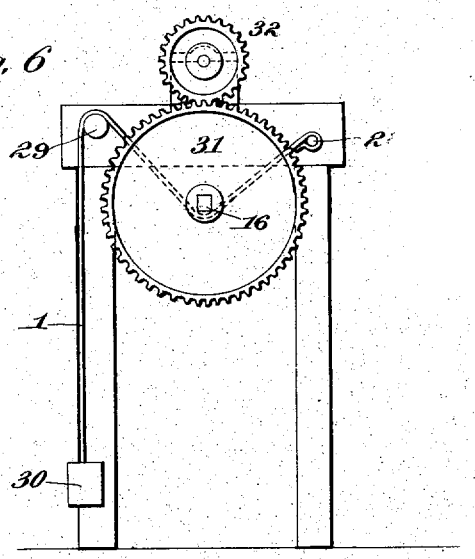

The same operation of baling cotton and other loose fibrous materials as that above described is also incident to the modified construction of baling-press illustrated in Figs. 5 and 6 of the drawings, in which the belt is held against rotation and the bale formed by the bat or sheet of fiber being wound in layers around the angular spindle 16, which will also be capable of removal from the press with the bale when the latter is finished, but which is not mounted in movable journal-boxes. The belt 1 is secured at one end to the bar or rod 28, passes thence beneath the spindle 16, and thence over the guide-roller 29, its lower or free end being provided with the weight or heavy bar 30. This arrangement of said belt, as shown in Fig. 6, forms a loop or bight beneath said spindle. The thin sheet or bat of fiber is first delivered upon the inclined surface of said belt, passed down the same, secured to said spindle, and then turned or wound in cylindrical form around the same, layer upon layer, each layer being simultaneously subjected to frictional contact within the bight of said belt and to pressure of the belt produced by the weight upon the free end thereof, which action is continued until the desired size of bale has been reached.

In case of a uniform feed or delivery of the sheet or bat of fiber into this form of press, as is preferable, it becomes necessary, as with the presses shown in Figs. 1 and 4, to revolve the bale at the same peripheral speed at all stages of its formation. This may be accomplished by providing the spindle 16 with a relatively large gear-wheel 31, which meshes with a smaller gear-wheel 32, attached to one end of the shaft 33, the other end of said shaft being provided with the bevel gear-wheel 34. This wheel has variable speed imparted thereto by the bevel gear-wheel 35, the power-pulley 36, the intermediate reversely-arranged conical pulleys 37, the endless belt 38, connecting the same, and the pivoted lever 39, which is provided at its outer end with the fork 40 for shifting the belt upon said conical pulleys. The inner end of this pivoted lever is provided with the friction-disk 41, which normally, or when the press is empty and in condition for starting, rests against the outer surface of the belt 1 at a point just beneath the spindle 16. As the sheet or bat of fiber is delivered upon said belt and turned or wound around said spindle, layer upon layer, and as the diameter of the bale being formed gradually increases from the start, the loop or bight of the belt becomes enlarged, presses downward the friction-disk 41 on the inner end of the pivoted lever 39, and raises the outer forked end thereof, which shifts or raises the endless belt 38 over the peripheries of the conical pulleys 37.

The operation of this construction of baling-press in baling cotton and other fibrous materials is the same as that incident to the presses illustrated in Figs 1 and 4, which is that a uniform peripheral speed is imparted to the bale from the commencement of its formation, an unbroken or continuous feed of the sheet or bat of fiber is secured, and a bale is formed in which each layer, commencing with the center one, is simultaneously subjected to compression upon both sides and to the friction of the belt upon its outer side; also, as in the modified construction of press shown in Fig. 4, each outer layer is permitted to be wound more tightly by the constant contraction of the next inner layer, which is drawn inward toward the center of the bale or the spindle and subjected to the further pressure transmitted through said outer layer.

I claim—

1. A machine for forming a continuous sheet or bat of cotton into a cylindrical bale, wherein are combined a revoluble spindle to which the end of the sheet or bat is applied and upon which it is spirally wound, means for winding the bat or sheet upon said spindle, and means for applying heavy pressure to each layer of the bat as it is wound in place and for maintaining such pressure upon the bale during its entire formation, whereby a bale of cotton will be produced which will be in a tightly-compressed condition throughout, and from which the sheet or bat may be entirely unwound in a continuous unbroken condition, substantially as set forth.

2. A machine for forming a continuous sheet or bat of cotton into a cylindrical bale, wherein are combined a revoluble spindle to which the end of the sheet or bat is applied and upon which it is spirally wound, means for winding the bat or sheet upon said spindle with a constant or approximately constant peripheral speed, and means for applying heavy pressure to each layer of the bat as it is wound in place and for maintaining such pressure upon the bale during its entire formation, whereby a bale of cotton will be produced which will be in a tightly-compressed condition throughout, and from which the sheet or bat may be entirely unwound in a continuous unbroken condition, substantially as set forth.

3. A machine for forming a continuous sheet or bat of cotton into a cylindrical bale, wherein are combined a revoluble spindle upon which the bat or sheet is spirally wound, a traveling pressure-surface operated by power and normally in contact with said spindle, and between which and the spindle the end of the bat or sheet is applied, said traveling pressure-surface revolving the bale by friction throughout its formation, and a moving support in contact with the opposite side of said bale for receiving the thrust of said traveling pressure-surface, said spindle, pressure-surface and support being relatively movable away from each other to accommodate the increasing size of the bale, the bale throughout its formation being constantly subjected to heavy pressure and having a constant peripheral speed, whereby a bale of cotton will be produced which will be in a tightly-compressed condition throughout, and from which the sheet or bat may be entirely unwound in a continuous unbroken condition, substantially as set forth.

4. In a baling-press for cotton and other loose fibrous materials, the combination, with feeding mechanism and a belt arranged to form an expansible loop or bight, of means for subjecting said materials to simultaneous friction and pressure with said loop or bight, substantially as described.

5. In a baling-press for cotton and other loose fibrous materials, the combination, with feeding mechanism and a belt having an expansible loop or bight, of means for rotating and winding said materials within said loop or bight, substantially as described.

6. In a baling-press for cotton and other loose fibrous materials, the combination, with feeding mechanism and a belt arranged to form an expansible loop or bight, of means for winding said material from the center of the bale, layer upon layer, and for simultaneously subjecting the same to friction and pressure, substantially as described.

7. In a baling-press for cotton and other loose fibrous materials, the combination, with feeding mechanism and a belt arranged to form an expansible loop or bight, of means for subjecting said materials to simultaneous friction and pressure within said loop or bight, said means consisting of a weight attached to said belt, and a revolving spindle arranged within said loop or bight, substantially as described.

8. In a baling-press for cotton and other loose fibrous materials, the combination, with feeding mechanism and a belt arranged to form an expansible loop or bight, of a weight connecting with said belt, a spindle arranged within said loop or bight and means for imparting variable speed to said spindle, substantially as described.

9. In a baling-press for cotton and other loose fibrous materials, the combination, with feeding mechanism, an endless, traveling belt arranged to form an expansible loop or bight, rollers for supporting and guiding said belt, and the heavy tension-roller arranged within said belt, of means for imparting motion to said belt, and, also, for forming a bale within the loop or bight of said belt, substantially as described.

10. In a baling-press for cotton and other loose fibrous materials, the combination, with feeding mechanism, an endless, traveling belt, arranged to form an expansible loop or bight, rollers for supporting and guiding said belt, and the heavy tension-roller arranged within said belt, of means for imparting motion to said belt, and, also, for forming a bale within the loop or bight of said belt, said means consisting, respectively, of the gear-wheels 4′, 5′, and 5″, and the revolving spindle 16, substantially as described.

11. In a baling-press for cotton and other loose fibrous materials, the combination, with feeding mechanism, an endless, traveling belt, arranged to form an expansible loop or bight, rollers for supporting and guiding said belt, and the heavy-tension-roller arranged within said belt, of means for imparting motion to said belt, and also, for forming a bale within the loop or bight of said belt, said means consisting, respectively, of the gear-wheels 4′, 5′, and 5″, and the revoluble and slidable spindle 16, substantially as described.

12. In a baling-press for cotton and other loose fibrous materials, the combination, with feeding mechanism, an endless traveling belt arranged to form an expansible loop or bight, rollers for supporting and guiding said belt, and the heavy tension-roller arranged within said belt, of means for forming a bale within said loop or bight and means for permitting of the removal of said bale therefrom, substantially as described.

13. In a baling-press for cotton and other loose fibrous materials, the combination, with feeding mechanism, an endless traveling belt arranged to form an expansible loop or bight, rollers for supporting and guiding said belt, and the heavy tension-roller arranged within said belt, of means for forming a bale within said loop or bight and means for permitting of the removal of said bale therefrom, said means consisting, respectively, of the revoluble and removable spindle 16, and of the vertically-sliding frame 8, having the roller 2 at its upper end, and the screw and bevel-wheel gearing 9, substantially as described.

14. In a baling-press for cotton and other loose fibrous materials, the combination, with feeding mechanism, an endless weighted belt, arranged to form an expansible loop or bight, of a spindle arranged within said loop or bight and means for imparting variable speed to said spindle, said means consisting of the movable journal-boxes 17, the disk 20, the friction-wheels 21, and devices for revolving the latter, substantially as described.

15. In a baling-press for cotton and other loose fibrous materials, the combination, with feeding mechanism, an endless weighted traveling belt, arranged to form an expansible loop or bight, of a spindle arranged within said loop or bight and means for imparting variable speed to said spindle, said means consisting of the movable journal-boxes 17, the disk 20, the friction-wheels 21, the shafts 22, the gearing 23, the adjustable bifurcated spring 24, and means for connecting the same to said shafts, substantially as described.

16. A baling-press for cotton and other loose fibrous materials, provided with a weighted traveling belt arranged to form an expansible loop or bight and for subjecting said materials to simultaneous friction and pressure, in combination with means for feeding a thin sheet or bat of said materials into the loop or bight of said belt, substantially as described.

17. A baling-press for cotton and other loose fibrous materials, provided with a weighted traveling belt arranged to form an expansible loop or bight and for subjecting said materials to simultaneous friction and pressure, in combination with an endless, conveying or feeding apron for feeding a thin sheet or bat of said materials into the loop or bight of said belt, substantially as described.

18. A baling-press for cotton and other loose fibrous materials, provided with a weighted belt arranged to form an expansible loop or bight and for subjecting said materials to simultaneous friction and pressure, in combination with the removable shaft or spindle 16, the rollers 14 and 15, and the endless conveying-apron 12, substantially as described.

19. In a baling-press for cotton and other loose fibrous materials, the combination, with the endless traveling belt 1, formed with the loop or bight, the rollers 2 and 4, the suspension-roller 5, the guide-roller 6, the tension-roller 7, the endless conveying or feeding apron 12, and the rollers 14 and 15, substantially as described.

20. In a baling-press for cotton and other loose fibrous materials, the combination, with the endless belt 1, formed with the loop or bight, the shaft or spindle 16 arranged within said loop or bight, the rollers 2 and 4, the suspension-roller 5, the guide-roller 6, the tension-roller 7, the endless conveying or feeding apron 12, and the rollers 14 and 15, substantially as described.

21. In a baling-press for cotton and other loose fibrous materials, the combination, with the endless belt 1, formed with the loop or bight, the shaft or spindle 16 arranged within said loop or bight, the vertically-movable roller 2, the roller 4 above and in close proximity thereto, the suspension-roller 5, the guide-roller 6, the tension-roller 7, the endless, conveying or feeding apron 12, and the rollers 14 and 15, substantially as described.

22. In a baling-press for cotton and other loose fibrous materials, the combination with the endless belt 1, formed with the loop or bight, the shaft or spindle 16, arranged within said loop or bight, the horizontally-movable journal-boxes 17, within which said shaft or spindle is mounted, the vertically-movable roller 2, the roller 4 above and in close proximity thereto, the suspension-roller 5, the guide-roller 6, the tension-roller 7, the endless, conveying or feeding apron 12, and the rollers 14 and 15, substantially as described.

In testimony whereof I affix my signature, in presence of two witnesses, this 22d day of January, A. D. 1895.

JOHN W. GRAVES.

Witnesses:
CHARLES H. SMITH,
P. M. HOEFELS.